Feb. 3, 1925.
O. C. REEVES
1,524,954
COMMODITY RECEIVER FOR WEIGHING SCALES
Filed Oct. 20, 1922
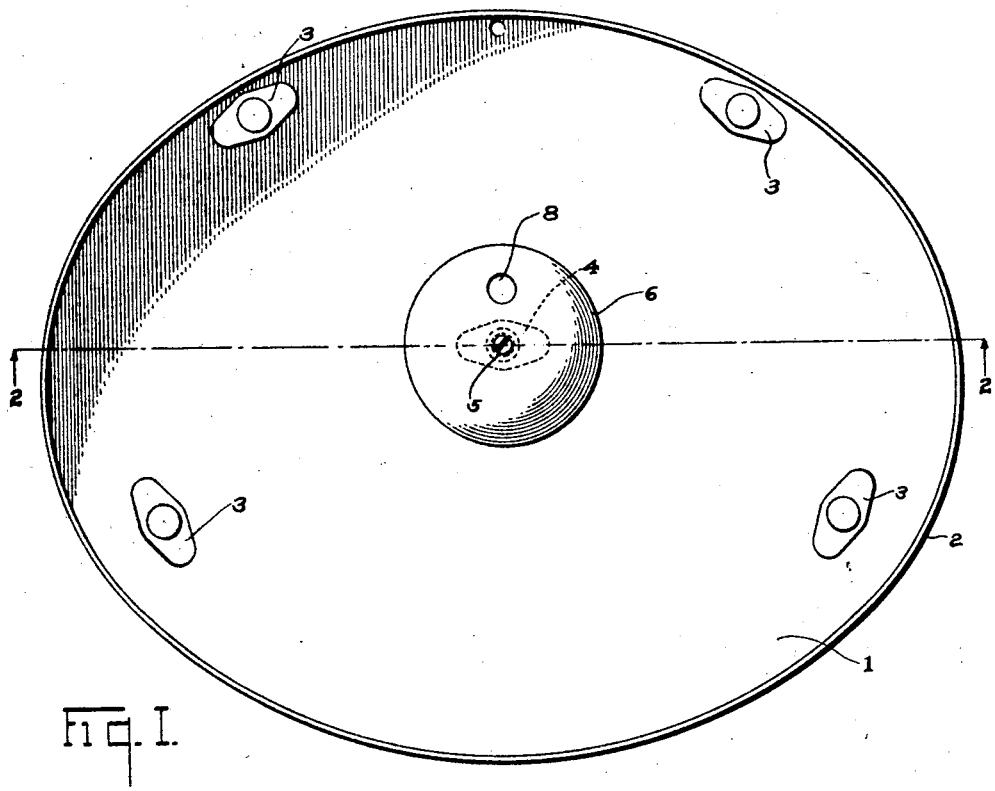
Fig. I.
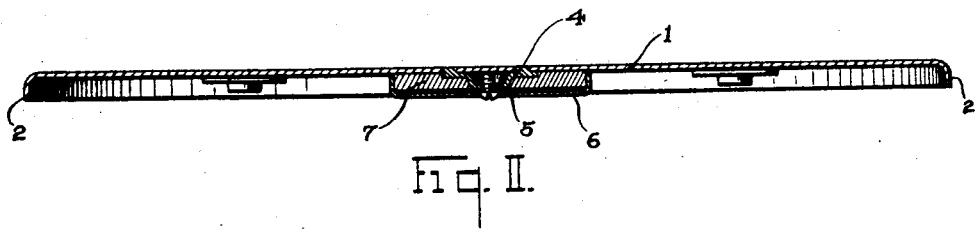
Fig. II.
Inventor
Orwell C. Reeves.
By C. C. Marshall
Attorney Patented Feb. 3, 1925.

1,524,954

UNITED STATES PATENT OFFICE.

ORWELL C. REEVES, OF TOLEDO, OHIO, ASSIGNOR TO TOLEDO SCALE COMPANY, OF TOLEDO, OHIO, A CORPORATION OF NEW JERSEY.

COMMODITY RECEIVER FOR WEIGHING SCALES.

Application filed October 20, 1922. Serial No. 595,762.

*To all whom it may concern:*

Be it known that I, ORWELL C. REEVES, a citizen of the United States, residing at Toledo, in the county of Lucas and State of Ohio, have invented certain new and useful Improvements in Commodity Receivers for Weighing Scales, of which the following is a specification.

This invention relates to commodity-receivers for weighing scales, and particularly to commodity-receivers for weighing scales of the type used upon retail counters and in industrial establishments for weighing comparatively light loads.

Commodity-receivers with which such types of scales are equipped are usually detachable, and where several scales are located close together the commodity-receivers sometimes become interchanged and the scales are thus thrown out of balance. One of the principal objects of this invention is to provide commodity-receivers which are capable of being sealed to uniform weights and are, therefore, interchangeable.

Another object of the invention is to provide a platter or other commodity-receiver sealed to a definite weight so that it may be used as a test weight.

Another object of the invention is to provide commodity-receivers of this type which are economical to manufacture and which are practically indestructible.

Still another object is to provide a commodity-receiver of this type which is sanitary and pleasing in appearance.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a bottom plan view of a scale platter embodying my invention; and

Figure II is a vertical sectional view taken substantially on the line II—II of Figure I.

While I have shown my invention as embodied in a platter, it is to be understood that it is applicable also to pans and scoops.

In the embodiment shown, the platter 1 is fabricated of sheet steel and is of oval shape, having a depending peripheral flange 2 which not only stiffens the platter, but also gives it the appearance of strength and thickness without materially increasing its weight. The pleasing appearance of the platter is further enhanced and its upper surface is protected against corrosion and made sanitary by means of a suitable coat of protecting material, preferably porcelain-enamel. Spot-welded or otherwise suitably secured to the lower side of the platter 1 are lugs 3 which are adapted to rest upon the spider or other member by which the platform is supported, and secured by spot-welding or other means in a substantially central position to the lower side of the platform is a sheet metal boss 4 having a threaded opening adapted to receive a screw 5 which serves to retain in position against the lower side of the platter a cup-like receptacle 6 adapted to contain the lead or other loading material 7. The bottom of the receptacle 6 contains an opening 8 through which the loading metal 7 is poured while in the molten state, the platter 1 being, of course, inverted during this operation.

It is desirable that occasional tests be made to determine whether or not the scale is functioning properly, but very few establishments are equipped with test weights. In places in which two or more scales having commodity-receivers sealed to a uniform weight according to my invention are used, the commodity-receiver of one scale may be used as a test weight to determine whether or not another is functioning properly. The gauge of the sheet metal of which the platter is made is such that the weight of the platter when the loading box is empty is somewhat less than the weight to which it is to be sealed, and it is brought to the desired weight by pouring molten metal into the loading box through the opening 8.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a commodity-receiving platter for weighing scales, in combination, a body having a depending peripheral edge, and a loading box secured to the under side of said body.

2. In a commodity-receiving platter for weighing scales, in combination, a body of substantially oval shape, said body having a depending peripheral edge, and a loading box secured to the under side of said body.

3. In a commodity-receiving platter for weighing scales, in combination, a substantially oval body having a depending peripheral edge, a series of lugs secured to the lower side of said body and adapted to engage a support for said platter, and a loading box secured to the lower side of said body.

ORWELL C. REEVES.

Witnesses:
FRANCES DOYLE,
H. O. ERNSBERGER.